(12) United States Patent
Clauer et al.

(10) Patent No.: US 12,172,714 B2
(45) Date of Patent: Dec. 24, 2024

(54) DRIVERLESS TRANSPORT VEHICLE AND METHOD FOR MOVING A SEMI-TRAILER USING A DRIVERLESS TRANSPORT VEHICLE

(71) Applicants: Bayerische Motoren Werke Aktiengesellschaft, Munich (DE); Stäubli WFT GmbH, Sulzbach-Rosenberg (DE)

(72) Inventors: Dana Clauer, Munich (DE); Josef Eckl, Prackenbach (DE); Thomas Irrenhauser, Munich (DE); Marco Prüglmeier, Munich (DE); Fabian Wittich, Gebenbach (DE)

(73) Assignees: Bayerische Motoren Werke Aktiengesellschaft, Munich (DE); Stäubli WFT GmbH, Sulzbach-Rosenberg (DE)

( * ) Notice: Subject to any disclaimer, the term of this patent is extended or adjusted under 35 U.S.C. 154(b) by 514 days.

(21) Appl. No.: 17/297,941

(22) PCT Filed: Nov. 29, 2019

(86) PCT No.: PCT/EP2019/083079
§ 371 (c)(1),
(2) Date: May 27, 2021

(87) PCT Pub. No.: WO2020/109548
PCT Pub. Date: Jun. 4, 2020

(65) Prior Publication Data
US 2022/0024530 A1 Jan. 27, 2022

(30) Foreign Application Priority Data
Nov. 30, 2018 (DE) ..................... 10 2018 130 585.0

(51) Int. Cl.
*B62D 53/00* (2006.01)
*B60W 60/00* (2020.01)
(Continued)

(52) U.S. Cl.
CPC ......... *B62D 53/12* (2013.01); *B60W 60/0025* (2020.02); *B62D 49/007* (2013.01); *B62D 53/0842* (2013.01); *B60W 2300/145* (2013.01)

(58) Field of Classification Search
USPC .............................. 701/23–28; 700/245–264
See application file for complete search history.

(56) References Cited

U.S. PATENT DOCUMENTS 2,710,201 A 6/1955 Winn
3,391,950 A 7/1968 Carter
(Continued)

FOREIGN PATENT DOCUMENTS

CN 1922041 A1 2/2007
CN 100443350 C 12/2008
(Continued)

OTHER PUBLICATIONS

German Office Action and Search Report from related German Patent Application No. 102018130585A dated Sep. 10, 2020; 17 pages.
(Continued)

*Primary Examiner* — Jonathan L Sample
(74) *Attorney, Agent, or Firm* — FITCH EVEN TABIN & FLANNERY, LLP

(57) ABSTRACT

The invention relates to a driverless transport vehicle for moving a semi-trailer. The driverless transport vehicle comprises a base body and a telescopic arm protruding from the base body, said telescopic arm comprising a surroundings detection device on one end facing away from the base body.
(Continued)

The invention also relates to a method for moving a semi-trailer using a driverless transport vehicle.

16 Claims, 2 Drawing Sheets

(51) Int. Cl.
  *B62D 49/00* (2006.01)
  *B62D 53/08* (2006.01)
  *B62D 53/12* (2006.01)

(56) References Cited

U.S. PATENT DOCUMENTS

| | | | |
|---|---|---|---|
| 3,506,230 A | | 4/1970 | Vivian |
| 3,603,544 A | | 9/1971 | Griffith |
| 3,628,811 A | | 12/1971 | Rivers |
| 5,109,940 A | * | 5/1992 | Yardley .............. B60D 1/06 280/496 |
| 5,154,249 A | * | 10/1992 | Yardley .............. B62D 49/007 280/496 |
| 5,559,696 A | * | 9/1996 | Borenstein .......... G01C 21/12 701/23 |
| 6,588,418 B1 | * | 7/2003 | Loving .............. A47J 37/0786 126/41 R |
| 7,429,051 B2 | | 9/2008 | Bauer |
| 7,731,215 B2 | | 6/2010 | Alguera |
| 7,793,966 B2 | | 9/2010 | Richter |
| 8,798,842 B2 | * | 8/2014 | Woolf .............. B60D 1/36 701/25 |
| 8,838,322 B1 | | 9/2014 | Zhu |
| 8,930,140 B2 | * | 1/2015 | Trombley .......... B62D 15/027 701/28 |
| 10,562,463 B1 | * | 2/2020 | Speer .............. B60R 9/06 |
| 11,358,660 B2 | | 6/2022 | Newton |
| 11,420,691 B2 | | 8/2022 | Köster |
| 2003/0233177 A1 | * | 12/2003 | Johnson ............ G05D 1/0236 701/28 |
| 2006/0037787 A1 | | 2/2006 | Hammonds |
| 2006/0293800 A1 | | 12/2006 | Bauer |
| 2008/0036175 A1 | | 2/2008 | Alguera |
| 2011/0037241 A1 | | 2/2011 | Temple |
| 2011/0107938 A1 | | 5/2011 | Weidemann et al. |
| 2012/0191285 A1 | * | 7/2012 | Woolf .............. B60D 1/62 701/25 |
| 2013/0193669 A1 | | 8/2013 | Glazner |
| 2013/0226390 A1 | * | 8/2013 | Luo .............. B60D 1/36 348/148 |
| 2014/0251556 A1 | | 9/2014 | Orton |
| 2015/0045992 A1 | * | 2/2015 | Ashby .............. E02F 9/205 701/2 |
| 2017/0192438 A1 | * | 7/2017 | Morimoto .......... B60W 40/13 |
| 2017/0231427 A1 | * | 8/2017 | Cathey ............ A47J 37/0763 99/325 |
| 2018/0022405 A1 | * | 1/2018 | Gecchelin .......... B62D 47/025 701/23 |
| 2018/0341259 A1 | * | 11/2018 | Stroebel .......... B60D 1/62 |
| 2019/0064828 A1 | * | 2/2019 | Meredith .......... G05D 1/0242 |
| 2019/0064835 A1 | | 2/2019 | Hoofard |
| 2019/0095861 A1 | * | 3/2019 | Baldwin .......... G06Q 10/0838 |
| 2019/0299729 A1 | * | 10/2019 | Sokuza ............ B60D 1/24 |
| 2019/0322327 A1 | * | 10/2019 | Baron ............ B62D 63/067 |
| 2019/0337342 A1 | | 11/2019 | Genheimer |
| 2019/0367105 A1 | | 12/2019 | Grossman |
| 2019/0367107 A1 | * | 12/2019 | Grossman .......... B62D 53/125 |
| 2020/0055357 A1 | | 2/2020 | Laine |
| 2020/0150686 A1 | * | 5/2020 | Wieschemann ..... G05D 1/0291 |
| 2022/0017162 A1 | | 1/2022 | Clauer |
| 2022/0024529 A1 | * | 1/2022 | Clauer ............ B62D 53/12 |
| 2022/0048497 A1 | | 2/2022 | Delizo |
| 2022/0055430 A1 | * | 2/2022 | Delizo ............ B62D 15/0285 |

FOREIGN PATENT DOCUMENTS

| | | |
|---|---|---|
| CN | 104417634 A | 3/2015 |
| CN | 105966177 A | 9/2016 |
| CN | 106741239 A | 5/2017 |
| CN | 106774300 | 5/2017 |
| CN | 107264629 | 10/2017 |
| CN | 107340771 | 11/2017 |
| CN | 207424675 U | 5/2018 |
| CN | 108508895 | 9/2018 |
| CN | 108839725 | 11/2018 |
| DE | 10335264 | 3/2005 |
| DE | 102004051760 | 4/2006 |
| DE | 102008014572 | 9/2009 |
| DE | 102009052382 | 5/2011 |
| DE | 102012207269 | 11/2013 |
| DE | 102016218603 | 3/2018 |
| DE | 202018104542 | 8/2018 |
| DE | 102018105998 | 5/2019 |
| FR | 2938812 A1 | 5/2010 |
| JP | 4553267 B1 | 9/2010 |
| WO | 2014131624 | 9/2014 |
| WO | 2018055321 | 3/2018 |
| WO | 2018162031 | 9/2018 |
| WO | 2018202483 | 11/2018 |

OTHER PUBLICATIONS

Article 94 (3) EPC from related European Patent Application No. 19817173.8 dated Jul. 29, 2022; 16 pages.
Chinese Office Action from related Chinese Patent Application No. 201980078776.6 dated Aug. 31, 2022; 24 pages.
Clauer, Dana: Concept creation for the Implementation of automated warehouse on wheels processes by means of driverless transport systems using the example of the BMW Group Werk Leipzig. In: 35. Deutscher Logistik-Kongress, Thesis Conference dated Oct. 18, 2018; 9 pages.
Ullrich, G.; Albrecht, T.: Driverless transport systems. 2nd edition, Wiesbaden, Springer, 2014, p. 127, 129.—ISBN 978-3-8348-2591-9; 4 pages.
Chinese Office Action; Chinese Application No. 201980078776.6; dated Feb. 27, 2023; 18 pages.
CNSR; Chinese Application No. 201980078776.6; dated Feb. 27, 2023; 2 pages.
DPMA; App. No. 10 2018 130 584.2; Search Report mailed Oct. 9, 2020.
EP Office Action; Application No. 19817173.8 dated Apr. 11, 2023; 8 pages.
KUKA—Robots & Automation; "Clever Autonomy for Mobile Robots—KUKA Navigation Solution"; hllps://www.youtube.
OSRAM; "Meilenstein fur Laser-Sensoren in selbslfahrenden Autos"; https://www.osram-group.de/de-de/media/press-releases/pr-2016/07-11-2016; Nov. 7, 2016.
PCT; App. No. PCT/EP/2019/083082; International Search Report and Written Opinion mailed Feb. 7, 2020.
PCT; App. No. PCT/EP2019/083076; International Search Report and Written Opinion mailed Feb. 7, 2020.
Wikipedia; "LKW-Bremsanlage"; https://de.wikipedia.org/w/index.php?title=LKW-Bremsanlage&oldid=I.
PCT; App. No. PCT/EP2019/083079; International Search Report and Written Opinion mailed Mar. 3, 2020.
EP Examination Report; European Application No. 19 816 237.2; dated Sep. 7, 2023 (14 pages).
Chinese Office Action from Chinese Application No. 201980078776.6; dated Oct. 29, 2023; In Chinese with English Translation (32 pages).
Clauer, D; "Konzepterstellung für die Implementierung automatisierter Warehouse on Wheels Prozesse mittels fahrerloser Transportsysteme am Beispiel des BMW Group Werks Leipzig"; https://mediatum.ub.tum.de/node?id=1518793&change_language=en: (2 pages).
Deutscher Logistik Congress Oct. 17-19, 2018; "C4 Thesis Conference" https://www.gbv.de/dms/tib-ub-hannover/1035300524.pdf (5 pages).

(56) References Cited

OTHER PUBLICATIONS

Office Action from U.S. Appl. No. 17/297,914; dated Dec. 29, 2023; in English (8 pages).
Office Action from U.S. Appl. No. 17/297,937; dated Oct. 26, 2023; in English (11 pages).
Prof. Dr.-Ing. Fottner, Johannes; "Publications of the chair" https://www.mec.ed.tum.de/en/fml/research/publications/ (2 pages).
The Federal Logistics Association (BVL) participant in the 35th edition of the German Logistics Exhibition in Berlin from 17 to Nov. 19, 2018; https://www.vallee-partner.de/blog/dlk18 (1 page).
European Patent Office, Commnication pursuant to Article 94(3) EPC, Examination Report, issued Mar. 26, 2024 for Euopean Application No. 19 817 173.8 (9 pages) and English Translation (9 pages).
Office Action from U.S. Appl. No. 17/297,937; dated Apr. 18, 2024; in English (12 pages).
Notice of Allowance from U.S. Appl. No. 17/297,914; Dated Apr. 11, 2024; in English (7 pages).

* cited by examiner

DRIVERLESS TRANSPORT VEHICLE AND METHOD FOR MOVING A SEMI-TRAILER USING A DRIVERLESS TRANSPORT VEHICLE

CROSS-REFERENCE TO RELATED APPLICATIONS

This application is a U.S. national phase application of International Application No. PCT/EP2019/083079, filed Nov. 29, 2019, designating the United States, which claims priority to German Application No. 10 2018 130 585.0, filed Nov. 30, 2018.

FIELD

A driverless transport vehicle for moving a semi-trailer is specified. Furthermore, a method for moving a semi-trailer by a driverless transport vehicle is specified.

BACKGROUND

Driverless transport vehicles often include a platform, on which load can be placed and moved. Moreover, it is already known to attach in particular smaller trailers to driverless transport vehicles. Usually, a hitch at the driverless transport vehicle serves hereto, to which a drawbar of the trailer can be fixed. Such vehicle/trailer combinations are for example used in assembly lines, in which assembly amounts are taken to the site of employment by means of the driverless transport vehicle.

Heretofore, it is disadvantageous that a sufficient detection of obstacles in the entire environmental area of the vehicles is very difficult especially with longer vehicle/trailer combinations or similar towing combinations.

It is an object to be solved of at least some embodiments to specify a driverless transport vehicle, by which a sufficient detection of obstacles is allowed also at the rear end of the vehicles. It is a further object to specify a method for moving a semi-trailer by a driverless transport vehicle.

SUMMARY

These objects are solved by subject matters according to the independent claims. Advantageous embodiments and developments of the subject matter are further apparent from the dependent claims, the following description and from the drawings.

A driverless transport vehicle described here, which can also be referred to as driverless transport system (FTS) or as automated guided vehicle (AGV), comprises a base body, for example a substantially cuboid base body, and an arm, in particular a telescopic arm, protruding from the base body. The arm, in particular the telescopic arm, comprises a surroundings detection device at an end facing away from the base body. By means of the arm, thus, the surroundings detection device can be positioned in the area of the trailer, in particular of the semi-trailer. Herein, the arm with the surroundings detection device arranged thereon is preferably arranged below the structure or the frame of the trailer/semi-trailer. Thus, the surroundings detection device can be positioned in a rear part of the vehicle/trailer combination/articulated truck by the arm, such that the environment in the area of the trailer/semi-trailer can also be (better) detected. Thus, obstacles in the vicinity of the trailer can be recognized and the autonomously driving vehicle/trailer combination or the articulated truck can be better navigated around them. For example, this is in particular of great advantage in reversing since the driverless transport system can timely intervene or stop and thus avoid dangerous situations in case of obstacles.

If the arm is formed quite long due to the length of the trailer/semi-trailer, thus, it is advantageous if it is supported on the roadway by means of wheels or is preferably movably supported in the area of its rear end. Therein, the wheels do not have to be necessarily arranged at the rear end of the arm, but this is of course advantageous for static reasons. With long arms, multiple wheels can theoretically also be provided arranged distributed over the length of the arm.

Preferably, the arm protruding from the base body is formed telescopically extendable as a telescopic arm and thus can for example be variably changed with respect to its length such that the surroundings detection device is farther departed from the base body of the driverless transport vehicle by extending the telescopic arm. Thus, the driverless transport vehicle comprises a telescopic arm, which is attached to the surface-movable driverless transport vehicle and is for example extendable in axial direction of a trailer or similar trailer. By the telescopic arm, the complete environment is monitored in elongated vehicles. Especially, this is important in reversing. Thereby, the FTS can stop and thus avoid dangerous situations.

Instead of telescopically elongating or extending and retracting the arm, other usual extension and retraction mechanism by folding, pivoting or similarly moving corresponding parts of the arm would of course also be conceivable.

According to a further embodiment, the surroundings detection device comprises at least one laser sensor or LIDAR sensor. These LIDAR sensors can be located at the end of the telescopic arm to be able to recognize obstacles in the vicinity of the trailer. However, other technologies for distance and/or speed measurement, for example on radar basis, would alternatively also be conceivable.

In this context, the surroundings detection device comprises at least one ultrasonic sensor in a further embodiment. Such sensors are particularly reliable and allow a particularly secure detection of the environment, respectively. In addition, in a particularly preferred embodiment, the surroundings detection device comprises two laser sensors and two ultrasonic sensors. Hereby, the environment of the vehicle/trailer combination/articulated truck can be particularly simply yet reliably ascertained.

The driverless transport vehicle described here in particular comprises a coupling device for coupling, in particular for automatically coupling, the driverless transport vehicle (FTF) to a kingpin of a semi-trailer or a so-called trailer. Thus, the surface-movable driverless transport system can in particular be used for the transport of a trailer on factory premises. Therein, the driverless transport system lifts the trailer at the front end and can move it with the aid of the wheels at the rear end of the trailer. The driverless transport system receives the trailer at the storage location and automatically takes it to the desired factory hall and an unloading and/or loading site, respectively. Therein, the driverless transport system can recognize obstacles in the vicinity of the platform and of the optionally attached semi-trailer with the aid of sensors and optionally drive around them or stop.

Preferably, the driverless transport system can tow loads up to 40 t, thus for example a semi-trailer with 40 t. Furthermore, the driverless transport vehicle is indoor and outdoor enabled and comprises an omnidirectional drive. Preferably, the driverless transport vehicle further comprises the most recent sensor and navigation technology.

The driverless transport system can be employed for the traction operation of different variants of semi-trailers, for example of tautliners, box trailers, low bed trailers, container trailers, tank trailers.

Therein, the coupling device preferably comprises an adapter unit for connecting to the kingpin of the semi-trailer in form- and/or force-fit manner. In particular, the coupling device includes a fifth-wheel coupling with a fifth-wheel plate, which is carried by the driverless transport system. Therein, the fifth-wheel coupling serves for supporting and carrying the trailer with intervention of the kingpin on the one hand and for locking the kingpin to the fifth-wheel plate on the other hand among other things. Herein, a normalized fifth-wheel coupling and fifth-wheel plate are in particular employed to be able to receive and maneuver as many usual semi-trailers as possible.

Furthermore, the coupling device can comprise a device for lifting the semi-trailer, in particular a hydraulic device. This device can for example be arranged between the fifth-wheel coupling and the structure/body of the driverless transport system such that the fifth-wheel coupling (and the front area of the semi-trailer/trailer associated therewith) can be lifted and lowered in relation to the structure/body of the driverless transport system. Alternatively hereto, the chassis of the driverless transport system could also be provided with an air suspension or the like as the said device, as it is usually also the case in semi-trailer tractors, such that lifting and lowering the front part of the semi-trailer/trailer is effected by height adjustment of the structure/body of the driverless transport system and thereby also of the fifth-wheel coupling.

According to a further embodiment, the driverless transport vehicle comprises a plurality of sensors for surroundings detection. For example, the driverless transport vehicle can comprise a substantially cuboid base body, at which at least four laser sensors are arranged. At least one laser sensor for surroundings recognition can respectively be arranged e.g. at four different corners or edges of the base body of the driverless transport vehicle. In addition, the driverless transport vehicle comprises sensors for automatically coupling the coupling device of the driverless transport vehicle to the kingpin in further configuration of the invention. Hereby, the fifth-wheel coupling can for example be aligned with and coupled to the kingpin in simple manner. Hereto, the driverless transport vehicle is moved in relation to the kingpin in particular depending on the data ascertained by the corresponding sensors. Alternatively hereto, it would optionally also be conceivable to support the fifth-wheel coupling relatively movable to the structure/body of the driverless transport vehicle in vehicle transverse direction and/or in vehicle longitudinal direction to hereby achieve the coupling position between fifth-wheel coupling and kingpin.

According to a further embodiment, the driverless transport vehicle comprises a plurality of drive wheels, which are controllable such that the driverless transport vehicle is omnidirectionally movable. For example, at least two drive wheels can be applied with different drive torques and/or oppositely oriented drive torques and/or oppositely oriented rotational directions. In particular, the driverless transport system comprises at least one front axle and at least one rear axle and corresponding drive wheels associated with the axles, respectively, which are operable with different drive torques and/or oppositely oriented drive torques and/or oppositely oriented rotational directions.

Furthermore, a method for moving a semi-trailer or similar trailer by a driverless transport vehicle is specified. Therein, a driverless transport vehicle, which can comprise one or more features of the above mentioned embodiments, is, preferably automatically, coupled to a semi-trailer, wherein a coupling device of the driverless transport vehicle is preferably connected to the kingpin of the semi-trailer. For example, an adapter unit of the coupling device can establish a form and/or force-fit connection to the kingpin. Furthermore, the semi-trailer can be lifted by a device for lifting, in particular a hydraulic device, immediately before and/or during and/or immediately after coupling such that the semi-trailer can be moved by the driverless transport vehicle.

Furthermore, an arm, in particular a telescopic arm, is provided and in particular extended by the driverless transport vehicle. The extension of the telescopic arm can in particular be effected in axial direction such that the surroundings detection device has a larger distance to the base body of the driverless transport vehicle after extension. The extension of the telescopic arm can be effected before and/or during and/or after coupling the driverless transport vehicle to the semi-trailer.

By the driverless transport vehicle described here and by the method described here, respectively, a detection of obstacles at the rear end of the trailer can be effected such that accidents can advantageously be avoided.

BRIEF DESCRIPTION OF THE DRAWINGS

Further advantages and advantageous embodiments of the driverless transport vehicle described here and of the method for moving a semi-trailer by a driverless transport vehicle are apparent from the embodiments described in the following in context of FIGS. 1 to 3. There is shown in.

Figure 1:
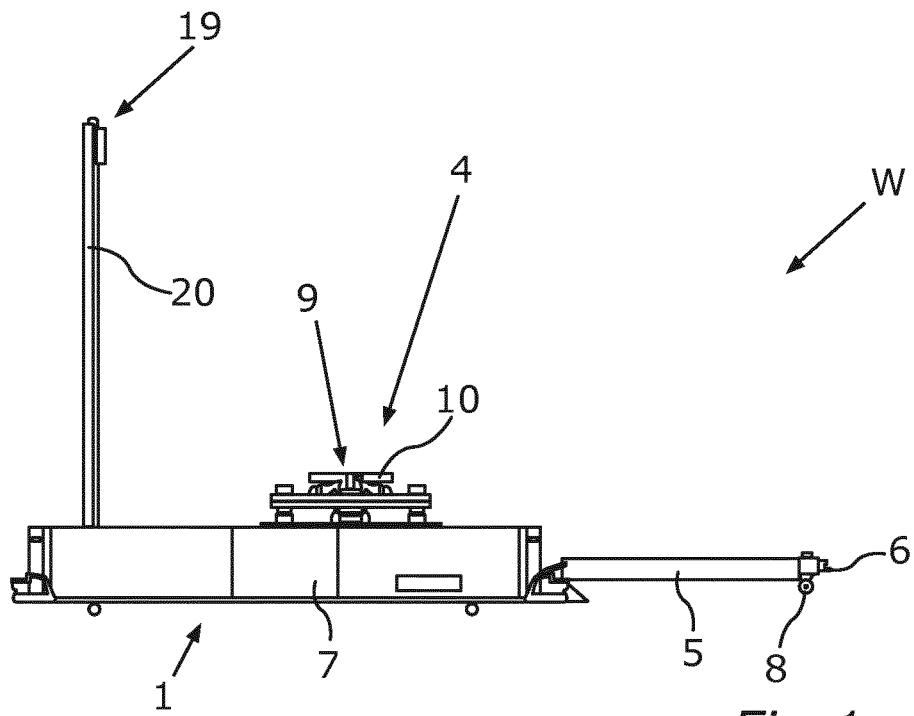
FIG. 1 a schematic representation of a driverless transport vehicle for moving a semi-trailer according to an embodiment, FIG. 2 a schematic representation of a telescopic arm of a driverless transport vehicle described here according to a further embodiment, and FIG. 3 a schematic representation of a driverless transport vehicle for moving a semi-trailer according to a further embodiment.

In the embodiments and figures, identical or identically acting constituents can each be provided with the same reference characters. The illustrated elements and the size ratios thereof among each other are basically not to be regarded as true to scale. Rather, individual elements can be illustrated excessively thickly or largely dimensioned for better representability and/or for better comprehension.

DESCRIPTION OF THE PREFERRED EMBODIMENTS

FIG. 1 shows a driverless transport vehicle 1 according to an embodiment. The driverless transport vehicle 1 comprises a structure referred to as base body 7 afterwards or a corresponding body and a telescopic arm 5 protruding from the base body 7, which comprises a surroundings detection device 6 at an end facing away from the base body 7.

Figure 3:
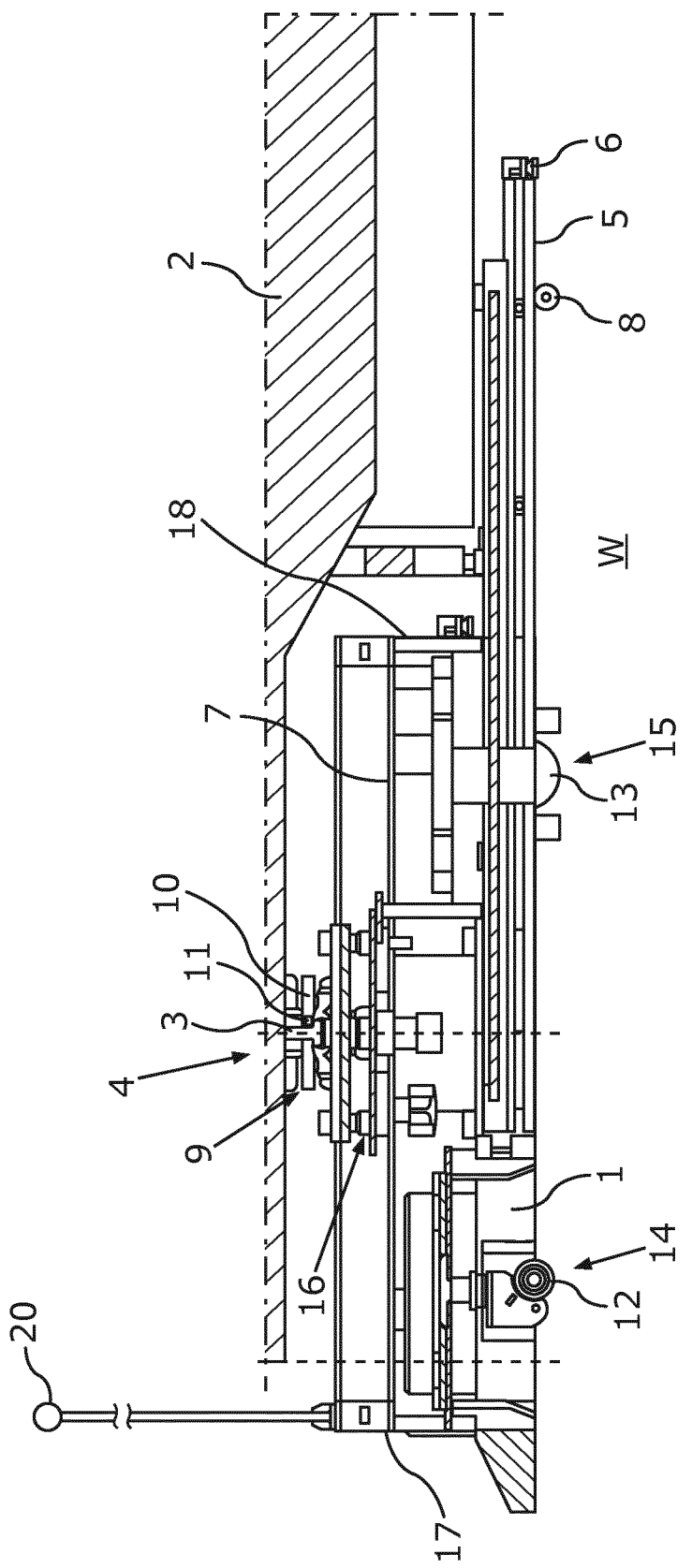

As is apparent from FIG. 3 in a schematic representation of a further embodiment, this driverless transport vehicle 1 can be coupled or is coupled to an indicated semi-trailer 2 or similar trailer. Therein, a coupling device 4 of the driverless transport vehicle 1 is connected to a kingpin 3 of the semi-trailer 2.

As is apparent from FIG. 1, the driverless transport vehicle 1 serves for moving the semi-trailer 2 in particular within a freight yard or similar factory premises W.

Namely, it has turned out that the previous moving in factory premises W, in which respective semi-trailers 2 or trailers are transported in production factories with a classical tractor, is not reasonable, in particular from economical view. Namely, these tractors are designed for the long-distance employment on the road and are not very efficient with respect to the energy consumption in drives in factory premises W, which are mostly only very short in proportion to the long-distance employment. In addition, it often has to be maneuvered on the factory premises W; however, the tractors are not very maneuverable.

For this reason, instead of a semi-trailer tractor, the driverless transport vehicle 1 is presently provided on the factory premises W, which can be automatically coupled to the semi-trailer 2. Hereto, the driverless transport vehicle 1 comprises the coupling device 4 apparent in FIG. 3, which is connectable to the kingpin 3 of the semi-trailer 2 or connected to it in FIG. 3.

As is additionally apparent from FIG. 3, the coupling device 4 comprises an adapter unit for connecting to the kingpin 3 in form- and/or force-fit manner, which here includes a usually employed fifth-wheel coupling 9. Herein, the fifth-wheel coupling 9 comprises a fifth-wheel plate 10, which is carried by the structure or body, which is here referred to as base body 7 of the driverless transport system 1 afterwards. A locking device 11 is integrated in the fifth-wheel plate 10, by means of which the kingpin 3 can be locked to the fifth-wheel plate 10. Thus, the fifth-wheel coupling 9 serves for supporting and carrying the trailer 2 with intervention of the kingpin 3 on the one hand and for locking the kingpin 3 to the fifth-wheel plate 10 on the other hand among other things. Herein, a normalized fifth-wheel coupling 9 and fifth-wheel plate 10 are in particular employed to be able to receive and maneuver as many usual semi-trailers 2 as possible.

Furthermore, the driverless transport vehicle 1 comprises a plurality of drive wheels, of which respective front and rear drive wheels 12, 13 are shown in FIGS. 1 and 3. Here, they are controllable such that the driverless transport vehicle 1 is omnidirectionally movable. For example, at least two drive wheels 12, 13 can be formed such that they can be applied with different drive torques and/or oppositely oriented drive torques and/or oppositely oriented rotational directions. In particular, the driverless transport system 1 can comprise at least one front axle 14 and at least one rear axle 15 and corresponding, associated drive wheels 12, 13, respectively, which are operable with different drive torques and/or oppositely oriented drive torques and/or oppositely oriented rotational directions. Thus, the driverless transport vehicle 1 is for example omnidirectionally movable in vehicle longitudinal direction and vehicle transverse direction. In a particular embodiment, the driverless transport vehicle 1 comprises a front axle 14 with respective, driven and steerable front wheels 12 and two rear axles 15 with respective, driven and steerable rear wheels 13. Hereby, the semi-trailer 2 is particularly well maneuverable.

It is clear that other configurations of driven and steerable wheels of the driverless transport vehicle 1 are also conceivable within the scope of the invention. Therein, the driverless transport vehicle 1 can also comprise rigid and/or non-driven wheels.

Furthermore, the driverless transport vehicle 1 comprises a device 16 for lifting the front end of the semi-trailer 2 such that it can be moved with the aid of its wheels 14, 15 at the rear end of the trailer 2. This device 16 can for example be a hydraulic device, by means of which the trailer 2 can be lifted immediately before and/or during and/or immediately after coupling the kingpin 3 to the fifth-wheel coupling 9, such that it can be moved by the driverless transport vehicle 1. In particular for improving the maneuverability of the trailer 2 and the articulated truck overall, it would optionally also be conceivable that at least one axle and the corresponding wheels 14, 15 of the trailer 2, respectively, are lifted by corresponding control/manipulation.

According to FIG. 3, in the present case, the hydraulic device 16 is arranged between the fifth-wheel coupling 9 and the base body 7 of the driverless transport system 1. Herein, respective hydraulic elements, for example piston-cylinder elements, are for example arranged between the fifth-wheel plate 10 and the base body 7, by means of which the fifth-wheel plate 10 can be lifted and lowered in relation to the base body 7 in vehicle vertical direction.

In order to achieve automatic coupling of the kingpin 3 to the fifth-wheel coupling 9, the coupling device 4 for example comprises respective sensors for automatically coupling to the kingpin 3. Hereby, the position of the fifth-wheel coupling 9 in relation to the kingpin 3 can for example be ascertained. Herein, it would be conceivable to support the fifth-wheel coupling 9 relatively movable to the base body 7 of the driverless transport vehicle 1 in vehicle transverse direction and/or in vehicle longitudinal direction such that the fifth-wheel coupling 9 can be (finely) adjusted in relation to the kingpin 3 according to relative position ascertained by means of the sensor technology until the coupling position between fifth-wheel coupling 9 and kingpin 3 is achieved. If a coarse adjustment between fifth-wheel coupling 5 and kingpin 3 is in particular required, it can be effected by moving the driverless transport vehicle 1 in relation to the kingpin 3. Optionally, the positioning of the fifth-wheel coupling 9 in relation to the kingpin 3 can also be performed exclusively by moving the driverless transport vehicle 1. After achieved coupling position between fifth-wheel coupling 9 and kingpin 3, which is for example detected via corresponding sensor technology, the automatic locking of the kingpin 3 to the fifth-wheel coupling 9 can then be effected by means of the locking device 11.

Decoupling after maneuvering the trailer 1 can be effected in correspondingly reversed order in that the locking device 11 is first detached and then the fifth-wheel coupling 9 is disengaged from the kingpin 3 by assistance by means of the sensor technology, in that for example the driverless transport vehicle 1 is moved and/or the fifth-wheel coupling 9 is moved in relation to the base body 7.

Alternatively to the described device for lifting the fifth-wheel plate 10, the chassis of the driverless transport system 1 can also serve as the device for lifting the front end of the semi-trailer 2. Herein, it would for example be conceivable to support the respective wheels 12, 13 of the driverless transport vehicle 1 on the base body 7 via an air suspension or the like such that lifting and lowering the driverless transport system 1 and thereby also the front end of the trailer 2 can be performed by height variation of respective air springs or the like of the air suspension.

In FIG. 3, the arm 5 is additionally illustrated in a detailed view, which protrudes from the rear end of the base body 7. In the present case, the arm is telescopically movable below the trailer 2. Hereto, the telescopic arm 5 comprises two support wheels 8, which roll on the ground upon extending the telescopic arm 5, at its rear or free end. During drive of the driverless transport vehicle 1, the wheels 8 serve for supporting the arm 5 and thus correspondingly roll with it. With a shorter arm 8, the wheels 8 can optionally be omitted. With a longer arm 8, further wheels can optionally also be provided over the length thereof.

Instead of telescopically elongating or extending and retracting the arm 8, other usual extension and retraction mechanisms by folding, pivoting or similarly moving corresponding parts of the arm would of course also be conceivable.

Figure 2:
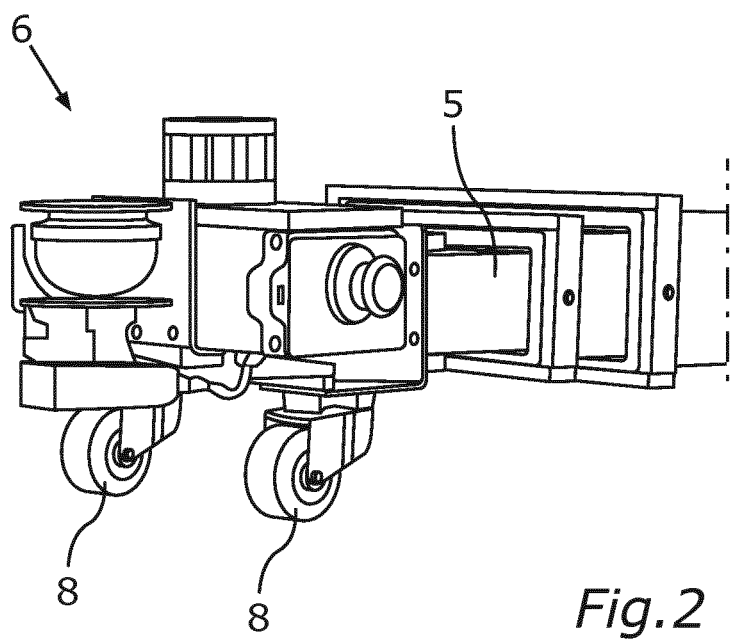

As is further apparent from FIGS. 2 and 3, a surroundings detection device 6 is provided at the telescopic arm 5, in particular at the rear end thereof. Thus, the surroundings detection device 6 can be positioned in the area of the trailer, in particular of the semi-trailer 2, by means of the arm 8. Herein, the arm 8 with the surroundings detection device 6 arranged thereon is preferably positioned below the structure or the frame of the trailer/semi-trailer 2. Thus, the surroundings detection device 6 can be positioned in a rear part of the vehicle/trailer combination/semi-trailer by the arm 8 such that the surroundings in the area of the trailer/semi-trailer 2 can also be (better) detected. Thus, obstacles in the vicinity of the trailer 2 can be (better) recognized and the autonomously driving vehicle/trailer combination or the articulated truck can be better navigated around them. For example, this is of great advantage in particular in reversing since the driverless transport system can timely intervene or stop and thus avoid dangerous situations in case of obstacles.

Preferably, the arm 8 is formed as long and extendable as the surroundings detection device 6 is positioned at least at the level of or behind a rearmost axle of the trailer 2 in vehicle longitudinal direction and thus can freely detect the rear end of the trailer 2.

Here, the surroundings detection device 6 comprises at least one laser sensor or LIDAR sensor. These LI DAR sensors can be located at the end of the telescopic arm 8 to be able to recognize obstacles in the vicinity of the trailer. However, other technologies for distance and/or speed measurement, for example on radar basis, would alternatively also be conceivable.

The driverless transport vehicle 1 additionally comprises a plurality of sensors for surroundings detection. For example, the driverless transport vehicle 1 can comprise at least four laser sensors or similar sensors at the base body 7. For example, respective sensors can be arranged at four different corners or edges 17, 18 of the base body 7 of the driverless transport vehicle 1. Therein, the driverless transport system 1 can recognize obstacles in the vicinity of the vehicle 1 and of the optionally attached semi-trailer 2 with the aid of the sensors and optionally drive around them or stop.

In addition, the driverless transport vehicle 1 can be connected to a central control of the factory premises for example by means of a transmit and/or receiver unit 19, which is here arranged at a support tower 20, to thus for example be guided to the corresponding trailers 1 and the corresponding unloading and/or loading sites, respectively.

In the present case, the driverless transport vehicle 1 is first coupled to the semi-trailer 2 or similar trailer for moving the semi-trailer 2 by the driverless transport vehicle 1 and the telescopic arm 5 is then extended, in particular in an axial direction of the vehicle, before the trailer/semi-trailer 2 is moved by the driverless transport vehicle 1.

The invention claimed is:

1. A driverless transport vehicle for moving a semi-trailer or similar trailer, comprising:
    a base body;
    an extendable arm protruding from the base body, which comprises a surroundings detection device at an end facing away from the base body; and
    a coupling device disposed on a top surface of the base body, the coupling device configured for engagement with the semi-trailer or similar trailer;
    wherein the arm is configured on the base body such that the arm and the surroundings detection device arranged on the arm are below a frame of the semi-trailer or similar trailer when the coupling device engages the semi-trailer or similar trailer, the surroundings detection device being extendable below the frame of the semi-trailer or similar trailer to detect objects in a vicinity of the semi-trailer or similar trailer.

2. The driverless transport vehicle according to claim 1, wherein the arm is a telescopic arm protruding from the base body that is formed telescopically extendable.

3. The driverless transport vehicle according to claim 1, wherein the surroundings detection device comprises at least one laser sensor.

4. The driverless transport vehicle according to claim 1, wherein the surroundings detection device comprises at least one ultrasonic sensor.

5. The driverless transport vehicle according to claim 1, wherein the surroundings detection device comprises two laser sensors and two ultrasonic sensors.

6. The driverless transport vehicle according to claim 1, wherein the coupling device is configured for automatically coupling the driverless transport vehicle to a kingpin of the semi-trailer or similar trailer.

7. The driverless transport vehicle according to claim 6, comprising a plurality of sensors for surroundings detection and/or for automatically coupling the coupling device of the driverless transport vehicle to the kingpin.

8. The driverless transport vehicle according to claim 7, wherein the driverless transport vehicle comprises a substantially cuboid base body, at which at least four sensors are arranged.

9. The driverless transport vehicle according to claim 1, wherein the arm is extendable to position the surroundings detection device behind a rear axle of the semi-trailer or similar trailer in a vehicle longitudinal direction when the coupling device engages the semi-trailer or similar trailer.

10. A method for moving a semi-trailer by a driverless transport vehicle, comprising the following steps:
    providing a driverless transport vehicle according to claim 1,
    providing a semi-trailer to be moved,
    coupling the driverless transport vehicle to the semi-trailer,
    extending the arm in an axial direction, and
    moving the semi-trailer by the driverless transport vehicle.

11. The driverless transport vehicle according to claim 6, wherein the base body is disposed entirely at or below a level of the kingpin.

12. The driverless transport vehicle according to claim 1, further comprising a communication device connected to the base body.

13. The driverless transport vehicle according to claim 6, wherein the base body is configured to fit underneath the semi-trailer or similar vehicle when the coupling device is engaging the kingpin.

14. The driverless transport vehicle according to claim 1, wherein the base body is not configured to accommodate a human occupant.

15. The driverless transport vehicle of claim 6, further comprising a hydraulic device configured to raise the coupling device to engage the kingpin.

16. The driverless transport vehicle of claim 2, wherein the telescopic arm further comprises one or more support wheels configured to support the telescopic arm when the arm is extended.

\* \* \* \* \*